United States Patent [19]

Reeber et al.

[11] 3,848,856

[45] Nov. 19, 1974

[54] LOCAL CORRECTION APPARATUS FOR A COLOR PREVIEWER

[75] Inventors: Nicholas J. Reeber, Hauppauge; Karl M. St. John, Huntington Station, both of N.Y.

[73] Assignee: Hazeltine Corporation, Greenlawn, N.Y.

[22] Filed: Oct. 1, 1973

[21] Appl. No.: 402,234

[52] U.S. Cl. .................................................. 358/76
[51] Int. Cl. ............................................ H04n 9/02
[58] Field of Search..................... 178/5.2 A; 358/76

[56] References Cited

UNITED STATES PATENTS

| | | | |
|---|---|---|---|
| 2,434,561 | 1/1948 | Hardy et al. | 178/5.2 A |
| 2,993,087 | 7/1961 | Hell | 178/5.2 A |
| 3,131,252 | 4/1964 | Farber et al. | 178/5.2 A |
| 3,739,078 | 6/1973 | Pugsley et al. | 178/5.2 A |

*Primary Examiner*—Richard Murray

[57] ABSTRACT

Disclosed is apparatus for use in a color previewer for simulating a graphic arts process, which enables the operator of the previewer to select a local area of a simulated reproduction and adjust the component color content of the selected area. In one embodiment of the invention the adjustment simulates hand etching of the selected local area on half-tone color separation transparencies. The apparatus may include circuits for measuring the component color content of the selected local area and thereby provide a calibration for the subsequent etching operation.

14 Claims, 4 Drawing Figures

LOCAL CORRECTION APPARATUS FOR A COLOR PREVIEWER

BACKGROUND OF THE INVENTION

This invention relates to graphic arts color previewers for simulating a graphic arts process and displaying a preview image simulating a color reproduction, and more particularly to apparatus for simulating an adjustment of the color content of a selected local area of the displayed preview image.

In a color previewer a set of color component signals are developed by successively scanning elemental areas of an input image. The input image may be in the form of a composite color image, color transparency or a set of color separations. The color component signals derived from the input image are electronically processed to simulate an actual graphic arts process. The previewer may include adjustments to the processing apparatus which simulate actual adjustments and variables available in the graphic arts process. Finally, a preview image is formed on a suitable display, which image simulates the color reproduction that will result from the actual graphic arts process. Typical color previewers are more fully described in the copending application of N. J. Reeber, Ser. No. 242,867, filed Apr. 10, 1972, entitled "Graphic Arts Process Simulation System," U.S. Pat. No. 3,123,666, entitled "Electronic Previewer For Color Reproduction Process," U.S. Pat. No. 3,128,333, entitled "Electronic Previewer For Color Printing Processes" and U.S. Pat. No. 3,131,252, entitled "Electronic Previewer for the Graphic Arts," all of which are assigned to the same assignee as the present application.

In a graphic arts process where high quality reproductions are required, it is often desirable to separately adjust the color content of local areas of the image. This is usually achieved by masking or by etching that particular area during the processing of color separations into plates or by selectively etching the plates. Most color previewers do not have the capability to simulate color adjustment in a local area only.

H. E. J. Neugebauer disclosed in U.S. Pat. No. 2,790,844 a technique for simulating local color corrections wherein separate color correction screens are simultaneously scanned with the original. Local color correction is accomplished by painting the area to be corrected with light or dark crayons on the separate correction screens.

A similar technique for local correction is described by H. E. J. Neugebauer in U.S. Pat. No. 2,799,722. This second technique makes use of specially prepared masks which are separately scanned to perform local area color correction.

Both of these techniques require a separate scanning apparatus and hand preparation of the local area color correction either by crayon or mask.

SUMMARY OF THE INVENTION

It is therefore an object of the present invention to provide apparatus for use in a graphic arts color previewer for adjusting the color content of a selected local area of the displayed review image.

It is a further object of the present invention to provide such apparatus wherein local area color correction may be simulated in a particularly simple manner without the use of a separate scanning apparatus.

It is a still further object of the present invention to provide such an apparatus wherein local area color correction may be simulated without hand preparation of correction materials.

In a graphic arts color previewer wherein a set of color component signals are developed by successively scanning elemental areas of an input image, the signals being individually representative of corresponding elemental areas of color separations in the graphic arts process being previewed, and wherein the color component signals are processed to provide on a display a preview image simulating a color reproduction of the input image, in accordance with the present invention, there is provided apparatus for adjusting the color content of a selected local area of the preview image. The apparatus includes means for generating a series of pulse type signals in synchronism with the scanning of the input image, the number of pulses, pulse duration and time of occurrence of the pulses in the series being selected to define a series of time intervals corresponding to a local area of the preview image. The apparatus also includes means responsive to the pulse type signals for adjusting the color content of at least one of the color component signals during the time interval defined by the pulse type signals to form a locally corrected color component signal, thereby causing an adjustment in the color content of the selected local area in the preview image.

For a better understanding of the present invention, together with other and further objects thereof, reference is made to the following description taken in conjunction with the accompanying drawings and its scope will be pointed out in the appended claims.

DESCRIPTION AND OPERATION OF THE FIG. 1 APPARATUS

Figure 1:
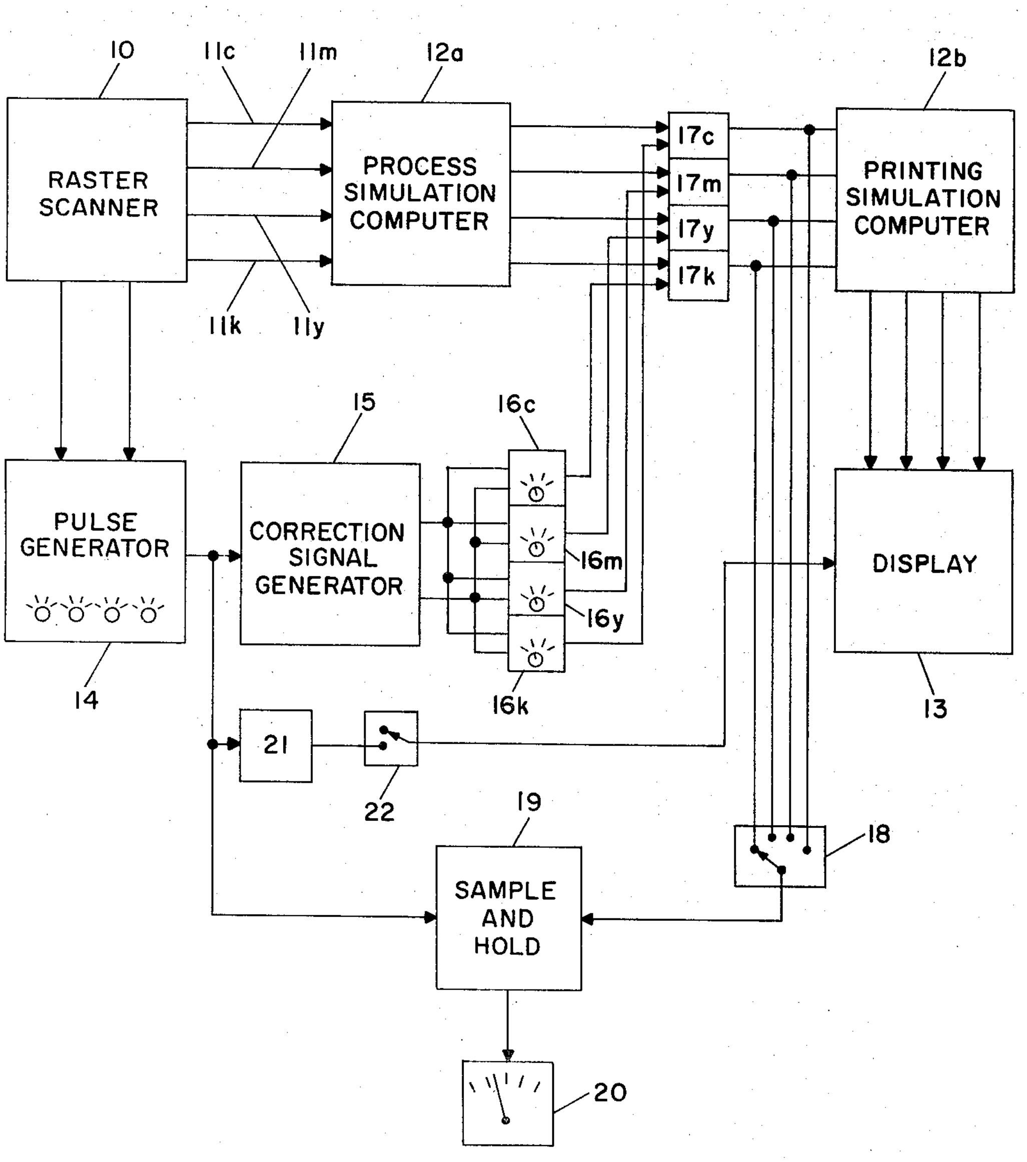
FIG. 1 is a block diagram of one form of color previewer having local area color correction apparatus constructed in accordance with the present invention.

FIG. 1 is a functional block diagram of a color previewer having apparatus for local area color correction which is constructed in accordance with the present invention. In the FIG. 1 embodiment raster scanner 10 scans an original color image, transparency or color separations of the image to produce a set of color component signals 11*c*, 11*m*, 11*y* and 11*k*, which represent respectively the cyan, magenta, yellow and black content of the image to be reproduced. The color component signals 11*c*, 11*m*, 11*y* and 11*k* may represent the transmissivity of the corresponding color separations or the reflectivity or transmissivity of the original image for these colors. In the FIG. 1 embodiment the four color components are the components typically used for four color printing. Alternate sets of color signals having a different four components, or a different number of components, can be used. In the FIG. 1 embodiment a process simulation computer 12*a* performs signal processing on the component signals 11 to simulate graphic arts processes used to produce halftone separations. The printing simulation computer 12*b* additionally processes the signals to simulate the production of printing plates and the use of those plates to produce a color reproduction. The particular arrangement of the simulation computer will depend on the particular printing process and may include simulation of halftone screening, plate etching, ink color and ink spread. Following signal processing the component color signals are used to provide a preview color image on the display 13 simulating the color reproduction which would be reproduced by the actual graphic arts process. The display 13 in the FIG. 1 embodiment may include additional processing apparatus for converting the four color component signals into the equivalent three color component signals useful for providing a display on a color T.V. tube. This additional processing apparatus has been described in the above-referenced application and patents.

The local area color correction apparatus in the FIG. 1 color previewer comprises items 14 through 22. Vertical and horizontal synchronization signals from the raster scanner 10 are supplied to pulse generator 14. Pulse generator 14 provides a series of pulse-type signals during each scan of the raster scanner 10. Controls are provided for variation of the number of pulses, pulse duration and time of occurrence of the pulses during each scan of the raster.

Figure 2:
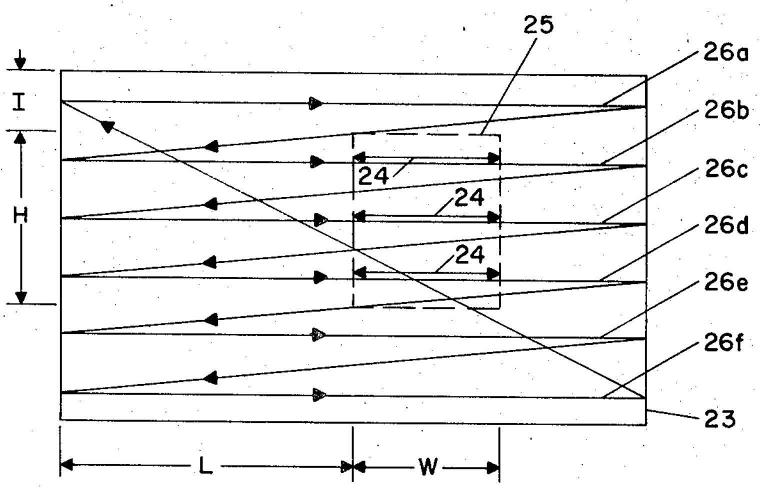
FIG. 2 illustrates a selected local area within a raster scan.
Figures 3A, 3B:
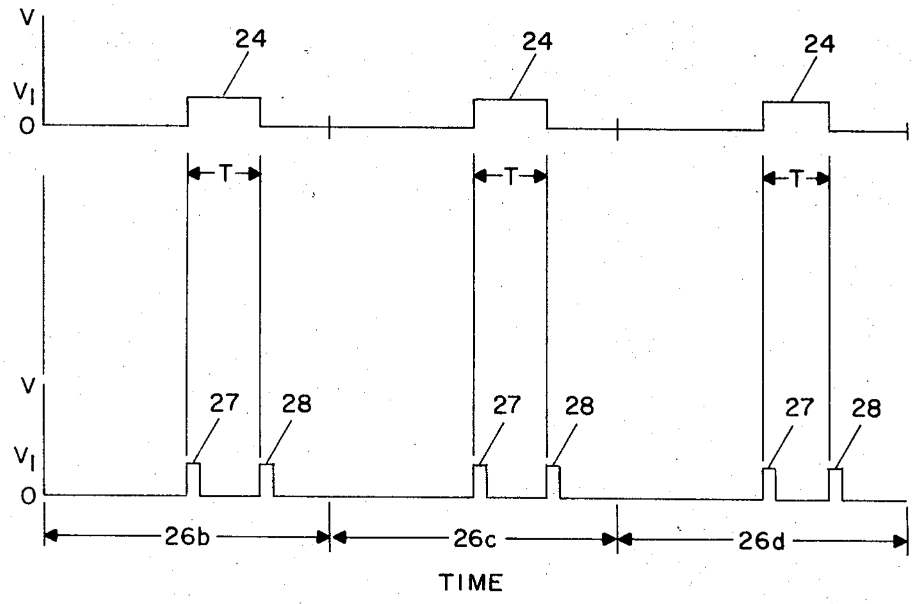
FIG. 3 illustrates a series of pulse-type signals.

FIG. 2 illustrates a simplified raster scan pattern 23 having six lines 26. During each scan of this raster three pulse-type signals 24 are generated by unit 14, one pulse during a selected identical portion of each of a selected set of adjacent line scans of the raster. Thus, pulses occur during lines **26*b*, 26*c* and 26*d*, for example. The number of pulses determines the vertical height (H) of the selected local area 25. The selected set of line scans determines the vertical position (I) of the selected local area 25 from the starting point of the raster scan. The time of occurrence of each pulse within a line scan determines the horizontal position (L) of the selected local area 25** and the pulse duration determines the horizontal width (W).

FIG. **3*a* illustrates one possible series of pulse-type signals usable in the FIG. 1 apparatus. Shown in time sequence are the three pulse-type signals 24 corresponding to the local area of the raster illustrated in FIG. 2. Also indicated on the time scale are the time intervals corresponding to the raster lines 26*b*, 26*c* and 26*d*. The duration of the pulse-type signals 24 defines time intervals (T) which correspond to the width (W) of the local area 25 of FIG. 2.**

Another series of pulse-type signals which may be used to define the local area of FIG. 2 is illustrated in FIG. **3*b*. In this case the series of pulse-type signals comprises a series of alternate first pulses 27 and second pulses 28.** The time interval (T) which defines the width of the local area is determined by the spacing of the leading edges of the first and second pulses in the series. In this embodiment the pulse duration is not important, only the time of occurrence of the pulses.

The controls on the pulse generator 14 of FIG. 1 can therefore be conveniently adjusted to appropriately regulate the number of pulses, pulse width and pulse time of occurrence with respect to the vertical and horizontal synchronization signals of the raster scanner 10 and therefore control the size and location of a rectangular selected local area 25 to be corrected.

The correction signal generator 15 supplies correction voltages during the time interval defined by the pulse-type signals. In the FIG. 1 embodiment the signal generator 15 supplies both positive and negative correction voltages to each of four control devices **16*c*, 16*m*, 16*y* and 16*k*, which may be potentiometers. These control devices 16 may then be adjusted to provide variable amplitude correction signals to their respective combining devices 17. The correction signals may be positive, negative or zero according to the adjustment of the control devices 16. The combining devices 17 in the FIG. 1 embodiment form the sun of the color component signals with their respective correction signals. The combining devices 17 may be other than devices which add the correction signal and component signal as shown in the FIG. 1** embodiment. According to the precise nature of the variable in the graphic arts process being simulated and the nature of the particular correction signal, the combining may be by multiplication or other mathematical function.

The local correction apparatus in the FIG. 1 embodiment simulates local etching of the positive or negative halftone separations used to manufacture printing plates. For this purpose it is appropriate that signal correction be made by addition or subtraction of a correction signal at a point following the process simulation computer **12*a* which simulates the production of these separations and before the printing simulation computer 12*b*.** Where other correction operations are to be simulated, such as masking during screening exposure, etc., the correction signal would appropriately be combined with the color component signals at the corresponding point in the simulation.

Apparatus 15, 16 and 17 of the FIG. 1 embodiment constitute one arrangement for adjusting the color content of the color component signals during the time interval defined by the pulse-type signals. Other techniques and apparatus responsive to the pulse-type signals may be used to perform the color content adjustment; for instance, a second color component signal processing apparatus may be provided with means for connecting the color component signal to the second signal processing apparatus during the time interval corresponding to the selected local area and bypassing the second signal processing apparatus during other portions of the signal. The second processing apparatus may then be used to provide independent adjustment of that portion of the color component signals corresponding to the selected local area without affecting the remaining portion of the color component signals.

In the FIG. 1 embodiment apparatus is provided for measuring the component color content of the corrected signals. For economy only one measuring channel is provided in the FIG. 1 system, although it will be apparent that four channels could be provided for simultaneous rather than sequential measurement of the four corrected signals. In the FIG. 1 apparatus four throw switch 18 is used to sequentially connect the measuring apparatus to the four color component signals.

The color component signals are gated in the sample-and-hold apparatus 19 by the pulse-type signals which designate the local correction area. In the manner the meter 20 responds only to the signals which represent the color content of the selected local area. Averaging circuits may be used in the apparatus 19 to provide a meter reading representing the average color content of the local area.

The FIG. 1 embodiment also includes a signal generating circuit 21 and a switch 22 for causing a visual indication on the displayed preview image corresponding to the selected local area. This apparatus is particularly useful for initial adjustment of the controls on the pulse generator 14 for designating the size and location of the particular local area of the display within which color adjustments are to be performed. Circuit 21 generates indicator signals during the time interval defined by the pulse-type signals supplied by pulse generator 14. The indicator signals are supplied to the display unit 13 when switch 22 is closed. These indicator signals are appropriately supplied to the video circuits of the display unit 13 to cause a visual indication of the selected local area of the display corresponding to the time intervals in the raster scan designated by the pulse-type signals. Typically, the visual indication may be a gating of the video signal to cause either a black or white rectangle to appear on the display, obliterating the previewed image in the selected local area. Alternately, the signals may be suitable for causing a white or black border around the selected local area on the display. When switch 22 is opened this indicator signal is no longer supplied to the display unit 13, causing the visual indication to vanish.

Interaction of the various elements of the FIG. 1 embodiment may be better understood by a description of the operation of the invention in previewing a color print. The operator of the color previewer places the original or color separations in the raster scanner 10. A preview color image is produced on the display 13, which simulates the actual color reproduction. Adjustments may then be made on controls of the simulation computers **12*a* and 12*b* to achieve the most acceptable overall color content of the simulated reproduction on the display 13.** The simulation computer adjustment readings can then be used to control the manufacture of printing plates. Very often, however, an acceptable reproduction cannot be achieved by identical color adjustment of the entire image. It may be desirable to adjust the color content of a particular portion of the image, for example, the background or one particular object, without affecting the remainder of the picture. It is also desirable to "preview" this local correction in the presence of the remaining portions of the image without changing the color of the remaining portions. The operator may accomplish this preview and local area color adjustment by using the apparatus of the present invention.

First, the operator may select the local area that is to be color adjusted by closing switch 22 and manipulating the controls on pulse generator 14 until the indicator on the display corresponds most nearly to the area which he wishes to adjust. Switch 22 is then opened causing the indicator to vanish.

Correction signal generator 15 then supplies correction voltages to controls 16. With controls 16 in the neutral position, the local area on the display is unaffected. When controls 16 are moved from the neutral position, positive or negative correction signals are supplied to combiners 17 and a corresponding color adjustment takes place on the display within the selected local area.

When the operator achieves what he considers to be the desired color of an object within the selected local area, he may use the measuring apparatus of switch 18, sample-and-hold 19 and meter 20 to obtain readings of the component color content of the object within that local area. This information may then be supplied to a craftsman for hand adjustment of the selected local areas of the color separation transparencies or plates. The local area corrections may be made by the craftsman by etching plates or halftone separations or by photographic exposure of separations with masks.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. In a graphic arts color previewer wherein a set of color component signals are developed by successively scanning elemental areas of an input image, said signals being individually representative of corresponding elemental areas of color separations in the actual graphic arts process being previewed, and wherein said color component signals are processed to provide on a display a preview image simulating a color reproduction of said input image, apparatus for adjusting the color content of a selected local area of said preview image, comprising:

means for generating a series of pulse-type signals in synchronism with the scanning of said input image, the number of pulses, pulse duration and time of occurrence of said pulse-type signals in said series being selected to define a series of time intervals corresponding to a local area of said preview image;

and means responsive to said pulse-type signals for adjusting the color content of at least one of said color component signals during said time intervals defined by said pulse-type signals to form a locally corrected color component signal;

thereby causing an adjustment in the color content of said selected local area in said preview image.

2. In a graphic arts color previewer wherein a set of color component signals are developed by successively scanning elemental areas of an input image, said signals being individually representative of corresponding elemental areas of color separations in the actual graphic arts process being previewed, and wherein said color component signals are processed to provide on a display a preview image simulating a color reproduction of said input image, apparatus for adjusting the color content of a selected local area of said preview image, comprising:

means for generating a series of pulse-type signals in synchronism with the scanning of said input image, the number of pulses, pulse duration and time of occurrence of said pulse-type signals in said series being selected to define a series of time intervals corresponding to a local area of said preview image;

means responsive to said pulse-type signals for generating an adjustable correction signal during said time intervals defined by said pulse-type signals;

and means for combining said correction signal with at least one of said color component signals to form a locally corrected color component signal, thereby causing an adjustment in the color content of said selected local area in said preview image.

3. Apparatus as specified in claim 2, wherein the time of occurrence of said pulse-type signals is adjustable, thereby permitting the selection of a local area at a different location in said preview image.

4. Apparatus as specified in claim 3, wherein the number of pulses and pulse duration of said pulse-type signals is adjustable, thereby permitting different size local areas to be selected.

5. Apparatus as specified in claim 2, wherein said correction signal is adjustable in amplitude.

6. Apparatus as specified in claim 5, wherein said correction signal comprises a series of constant voltage pulses.

7. Apparatus as specified in claim 2, wherein said means for combining comprises means for adding said correction signal and at least one of said color component signals.

8. Apparatus as specified in claim 2, wherein said input image is scanned by a raster scanner and wherein said pulse-type signals are generated during a selected identical portion of each of a selected set of adjacent line scans of said raster.

9. Apparatus as specified in claim 2, which additionally includes means for measuring the color content of that portion of said locally corrected color component signal corresponding to said selected local area.

10. Apparatus as specified in claim 2, which additionally includes means responsive to said pulse-type signals for generating a corresponding set of signals appropriate for causing a visual indication on said displayed preview image corresponding to said selected local area.

11. In a graphic arts color previewer, wherein a set of color component signals are developed by successively scanning elemental areas of an input image, said signals being individually representative of corresponding elemental areas of color separations in the actual graphic arts process being previewed, and wherein said color component signals are processed to provide on a display a preview image simulating a color reproduction of said input image, apparatus for adjusting the color content of a selected local area of said preview image, comprising:

means for generating a series of pulse-type signals in synchronism with the scanning of said input image, the number of pulses, pulse duration and time of occurrence of said pulse-type signals in said series being selected to define a series of time intervals corresponding to a local area of said preview image;

means responsive to said pulse-type signals for generating a plurality of individually adjustable correction signals, one for each of said color component signals, during said time intervals defined by said pulse-type signals;

and means for combining each of said correction signals with a corresponding one of said color component signals to form a locally corrected color component signal, thereby causing an adjustment in the color content of said selected local area of said preview image.

12. In a graphic arts color previewer, wherein a set of four color component signals are developed by raster scanning an input image, said signals being individually representative of corresponding elemental areas of color separations in the actual graphic arts process being previewed, and wherein said color component signals are processed to provide on a display a preview image simulating a color reproduction of said input image, apparatus for adjusting the color content of a selected local area of said preview image, comprising:

means for generating a series of pulse-type signals in synchronism with said raster scanning of said input image, said pulse-type signals occurring during a selected identical portion of each of a selected set of adjacent line scans of said raster, the number of pulses, pulse duration and time of occurrence of said pulse-type signals in said series being adjustable, and defining a series of time intervals corresponding to a selected local area of said preview image;

means responsive to said pulse-type signals for generating four individually adjustable, constant voltage correction signals during said time intervals defined by said pulse-type signals;

and means for individually adding each of said correction signals and a corresponding one of said color component signals to form a set of locally corrected color component signals;

thereby causing an adjustment in the color content of said selected local area in said preview image.

13. Apparatus as specified in claim 12, which additionally includes means for measuring the color content of that portion of said locally corrected color component signal corresponding to said selected local area.

14. Apparatus as specified in claim 12, which additionally includes means responsive to said pulse-type signals for generating a corresponding set of signals appropriate for causing a visual indication on said displayed preview image corresponding to said selected local area.

* * * * *